US011145306B1

(12) United States Patent
Harris

(10) Patent No.: US 11,145,306 B1
(45) Date of Patent: Oct. 12, 2021

(54) INTERACTIVE MEDIA SYSTEM USING AUDIO INPUTS

(71) Applicant: Ossum Technology Inc., New York, NY (US)

(72) Inventor: DeVon Lamar Harris, New York, NY (US)

(73) Assignee: Ossum Technology Inc., New York, NY (US)

( * ) Notice: Subject to any disclaimer, the term of this patent is extended or adjusted under 35 U.S.C. 154(b) by 169 days.

(21) Appl. No.: 16/668,942

(22) Filed: Oct. 30, 2019

Related U.S. Application Data

(60) Provisional application No. 62/753,151, filed on Oct. 31, 2018.

(51) Int. Cl.
*G10L 15/22* (2006.01)
*G10L 15/08* (2006.01)
*G06F 3/16* (2006.01)
*G06F 3/0482* (2013.01)
*G10L 15/30* (2013.01)

(52) U.S. Cl.
CPC .......... *G10L 15/22* (2013.01); *G06F 3/0482* (2013.01); *G06F 3/165* (2013.01); *G10L 15/08* (2013.01); *G10L 15/30* (2013.01); *G10L 2015/088* (2013.01); *G10L 2015/223* (2013.01)

(58) Field of Classification Search
CPC ......... G10L 15/22; G10L 15/08; G10L 15/30; G10L 2015/088; G10L 2015/223; G06F 3/0482; G06F 3/165
See application file for complete search history.

(56) References Cited

U.S. PATENT DOCUMENTS

| | | | |
|---|---|---|---|
| 8,381,108 B2 | 2/2013 | Fuller et al. | |
| 8,613,646 B2 | 12/2013 | Rogers | |
| 9,207,841 B2 | 12/2015 | Callanan | |
| 9,672,868 B2 | 6/2017 | Bloch et al. | |
| 9,740,751 B1 * | 8/2017 | Yeom | G10L 15/1822 |
| 9,833,698 B2 | 12/2017 | Haseltine et al. | |
| 10,091,545 B1 * | 10/2018 | Cwik | G10L 15/26 |
| 10,692,485 B1 * | 6/2020 | Grizzel | G10L 15/24 |
| 2006/0206328 A1 | 9/2006 | Lukas | |

(Continued)

FOREIGN PATENT DOCUMENTS

WO WO 2013/150378 A1 10/2013

*Primary Examiner* — Mohammad K Islam
(74) *Attorney, Agent, or Firm* — Amsel IP Law PLLC

(57) ABSTRACT

An interactive media system enables creation, editing, and presentation of voice-driven interactive media content. The interactive media content may include prompts for user input via voice, manual input, or gestures. In the case of an audio input, the interactive media player application obtains a text string representing the spoken phrases and matches the text string against a set of expected values corresponding to different predefined responses and each associated with a different possible action. Based on the matching of the phrase to an expected value, the interactive media player application dynamically selects and performs the action associated with the matching response. The action may comprise, for example, transitioning to playback of a different media object (e.g., a second video segment) and/or causing some other functionality programmatically accessible by the interactive media player application to occur.

20 Claims, 6 Drawing Sheets

(56) References Cited

U.S. PATENT DOCUMENTS

| | | |
|---|---|---|
| 2014/0078397 A1 | 3/2014 | Bloch et al. |
| 2014/0192140 A1 | 7/2014 | Peevers et al. |
| 2014/0270680 A1 | 9/2014 | Bloch et al. |
| 2015/0165310 A1 | 6/2015 | Rebh et al. |
| 2015/0293675 A1 | 10/2015 | Bloch et al. |
| 2016/0094866 A1 | 3/2016 | Frazzini et al. |
| 2016/0225187 A1 | 8/2016 | Knipp et al. |
| 2016/0323608 A1 | 11/2016 | Bloch et al. |
| 2017/0062012 A1 | 3/2017 | Bloch et al. |
| 2017/0083285 A1* | 3/2017 | Meyers ................ G10L 15/26 |
| 2018/0061419 A1* | 3/2018 | Melendo Casado .... G10L 15/22 |
| 2020/0285443 A1* | 9/2020 | Yuan ..................... G06F 3/167 |

* cited by examiner

INTERACTIVE MEDIA SYSTEM USING AUDIO INPUTS

RELATED APPLICATIONS

This application claims the benefit of U.S. Provisional Application No. 62/753,151 filed on Oct. 31, 2018, which is incorporated by reference herein.

BACKGROUND

Technical Field

This disclosure relates generally to an interactive media system, and more specifically, to an interactive media system that dynamically updates content based on audio inputs.

Description of the Related Art

Current interactive media players typically present discrete, custom made experiences that may involve some type of tactile input to control the presentation of content. Such systems lack any universal player to play the content or universal editor to create or edit interactive content in a user-friendly manner. Furthermore, such systems are limited in the types of interactions users can have with the content, thereby limiting the impact such content has on its viewers.

SUMMARY

A method, non-transitory computer-readable storage medium and system is disclosed for operating an interactive media player executing on a client device. A metadata file is obtained that comprises a sequence of instructions for controlling playback of interactive media via the interactive media player. The interactive media player executes a first instruction of the metadata file to retrieve a first media segment specified by the metadata file. The interactive media player plays the first media segment. The interactive media player executes a second instruction of the metadata file to activate a microphone of the client device. Audio is captured from the microphone of the client device. The interactive media player initiates a text-to-speech conversion of the audio captured from the microphone to obtain one or more input keywords. The one or more input keywords are compared to a predefined set of expected values specified in the metadata file. A matching response of the predefined set of expected values is detected that corresponds to the one or more input keywords. The interactive media player executes a third instruction of the metadata file to perform a first action associated with the matching response in the metadata file.

BRIEF DESCRIPTIONS OF THE DRAWINGS

The disclosed embodiments have other advantages and features which will be more readily apparent from the following detailed description and the appended claims, when taken in conjunction with the accompanying drawings, in which:

DETAILED DESCRIPTION

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

An interactive media system enables creation, editing, and presentation of voice-driven interactive media content. The interactive media content may include prompts for user input via voice, manual input, or gestures. In the case of an audio input, the interactive media player application obtains a text string representing the spoken phrases and matches the text string against a set of expected values corresponding to different predefined responses that are each associated with a different possible action. Based on the matching of the phrase to an expected value, the interactive media player application dynamically selects and performs the action associated with the matching response. The action may comprise, for example, transitioning to playback of a different media object (e.g., a second video segment) and/or causing some other functionality programmatically accessible by the interactive media player application to occur, as will be described in further detail below.

Figure 1:
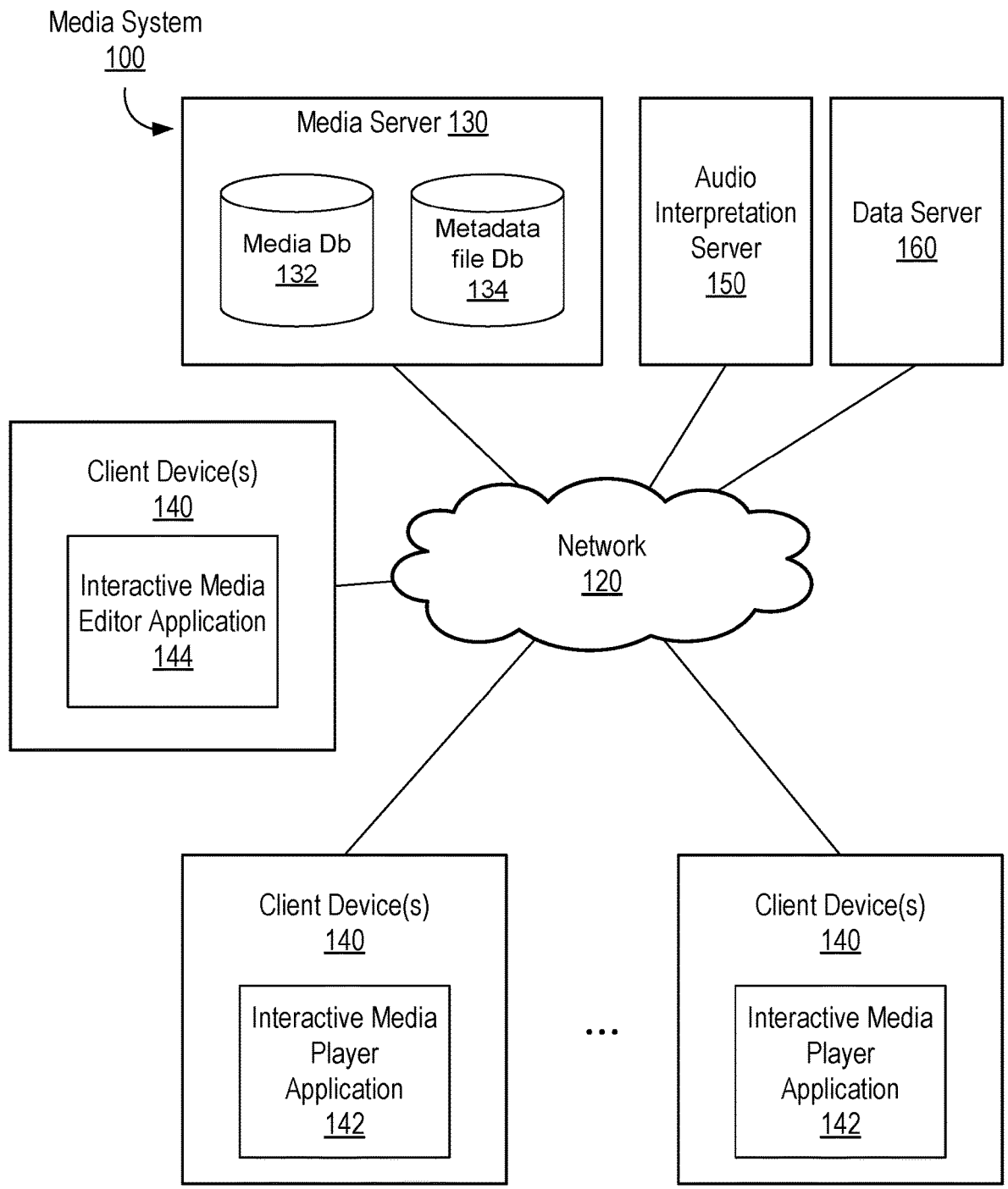
FIG. 1 illustrates a block diagram of an example embodiment of a media system.

FIG. 1 is a block diagram of a media system 100 according to one embodiment. The media system 100 includes a network 120, a media server 130, an audio interpretation server 150, a data server 160, and one or more client devices 140. In alternative configurations, different and/or additional components may be included in the media system 100.

The client device 110 comprises a computer device for creating, editing, and or viewing interactive media content. For example, at least one client device 140 executes an interactive media editor application 144 for creating or editing interactive media content and at least one client device 140 executes an interactive media player action 142 for playing interactive media content. In some instances, a client device 140 may execute both an interactive media editor application 144 and an interactive media player application 142. An example of an interactive media player application 142 is described in further detail below with respect to FIG. 2.

The interactive media player application 142 controls presentation of an interactive media experience. The interactive media experience may comprise various media objects such as video, images, audio, interactive graphics, web links, or other computer-presentable objects presented in accordance with a defined presentation structure. The presentation structure may define the timing of presentation of different objects that may be based in part on interactions (or lack of interactions) with interactive elements that are part of the interactive media experience. Thus, different viewers of the interactive media experience may have different viewing experiences depending on how the different viewers interact with the content. In various embodiments, interactions with the interactive media application 142 may cause different actions to be taken such as, for example, playing a video segment, displaying an image, playing an audio clip, redirecting a web browser to a web page at a specified network address, making a phone call, sending a text message, sending data to a predefined network address, opening or closing an application on the client device 140, etc.

Generally, the presentation structure of the interactive media experience controls presentation in a manner that includes seamless transitions between media objects and may mimic real-world interactions. For example, in a video-based interactive media experience, the interactive media player application 142 may seamlessly transition between video segments to provide the appearance of a continuous video stream. For interactive components, video may continue to be presented while waiting for the viewer to provide an input so as to provide the viewer with a realistic experience. For example, an interactive media experience may comprise a video tour through a virtual store in which the user can interact with articles in the store. In response to interactions with articles (e.g., based on voice requests, gestures, or manual clicks), the video may transition to other video segments that provide more information about the articles. These transitions may occur in a seamless manner that simulates a customer's experience and interactions in a store such as picking up an object, looking at an information display, etc. In another example use case, an interactive video may depict a virtual sales representative that may pose questions to the viewer or respond to questions from the viewer in a lifelike manner. The video of the virtual sales representative may continue to be presented while waiting for input from the viewer with the video depicting the virtual sales representative with the natural body language and expressions expected form a real-life sales person waiting for a response from a customer. Such an interactive video experience may be presented, for example, via in an-store display in a manner that simulates a real sales representative, or may be presented via a web page to enable a customer to interact outside of the store. Other example use cases will be apparent to those skilled in the art in view of the description herein.

In an embodiment, the interactive media experience may include specific prompts for interactions that may be presented as visual elements overlaid or otherwise embedded in the interactive media content. For example, the interactive media player application 142 may display visual elements that can be selected (via a user input device or voice input) to cause the interactive media player application 142 to take an action associated with the selection. Such visual elements may comprise, for example, selectable graphic files (which may be transparent or semi-transparent) that may be overlaid on other media content (e.g., a video). In other embodiments, a prompt for a user interaction may be presented via an audio prompt, or via a combination of audio and visual elements. In other embodiments, the interactive media content may take a specified action in response to an interaction without necessarily presenting an explicit prompt for the interaction. For example, the interactive media experience may be configured to take a predefined action in response to certain recognized inputs at any time during an interactive media experience (or during limited predefined time windows), without the interactive media player 142 expressly prompting for an input at a specific time. Interactions with the interactive media content may be made through a user input device (e.g., a mouse, a keyboard, a touchscreen, etc.), through voice input, through gesture input, or through any other control mechanism.

In an embodiment, the interactive media player application 142 reads a metadata file including a set of instructions that controls presentation of the interactive media content. The metadata file may comprise, for example, a JSON file, an XML file, a flat file, a YAML file, a binary format file, or other file. Instructions of the metadata file may include, for example, an instruction to play a specified video segment available at a specified network location, an instruction to display a specified image, an instruction to play a specified audio clip, an instruction to display text or a web link, or an instruction to present another object. Furthermore, the instructions of the metadata file may control the timing of presentation of different media objects, a manner of presentation of different objects, a timing of prompts for user inputs, and actions to be taken in response to different inputs. For example, a set of instructions may cause the interactive media player application 142 to prompt for a voice input while displaying a first video segment. The interactive media player application 142 then obtains the voice input and determines if the input matches any one of a set of predefined expected values specified in the metadata file. Here, the interactive media player application '142 may transmit captured audio to an audio interpretation server 150 that returns a text string corresponding to the captured audio for comparison against the predefined expected values as described in further detail below. The metadata file may further specify actions associated with each of the set of predefined expected values and cause the interactive media player application 142 to take the appropriate action in response to detecting a matching input. For example, the interactive media player application 142 may load a second video segment that corresponds to the matching input specified in the metadata file or take another specified action.

In an embodiment, the interactive media player application 142 determines which, if any, of a predefined set of expected values are matched by the text string. If a match is found, an action associated with the predefined response may be performed. In no match is found, a default action may be performed. In an embodiment, different combinations of keywords may be deemed to satisfy a given predefined response. For example, a predefined response that reads "A. Minnesota" may be satisfied with any of the answers, "A", "Minnesota," or "A. Minnesota." Furthermore, in an embodiment, the interactive media application 142 may enumerate a number of synonyms or other related responses that satisfy a predefined expected value. For example, an expected value of "sad" may be deemed as matching by an input that includes terms such as "melancholy," "upset," or other similar synonyms or related terms. In an embodiment, the interactive media player 142 may match related keywords automatically without the related keywords necessarily being specifically defined in the metadata file.

In other embodiments, more advanced natural language processing may be performed. For example, if no match is found, the interactive media player application 142 may determine a level of appropriateness of one of the response to the input prompt, and the interactive media player action 142 may take a different action depending on the level of appropriateness. Here, if the answer appears to be a genuine attempt to respond to the prompt but the input is unclear, the interactive media player application 142 may take an action that attempts to clarify the answer. Alternatively, if the answer is completely unrelated, the interactive media player application 142 may take a different action such as skipping to media content related to a different topic.

In an embodiment, the metadata file may cause the interactive media player application 142 to display a visual icon that represents a prompt for a voice input. The visual icon may comprise, for example, a graphic file overlaid on the media content or a graphic element displayed as part of a skin of the interactive media player application 142. Alternatively, or in addition, the metadata file may cause the interactive media player application 142 to output an audio clip that represents a prompt for a voice input. This visual or audio prompt beneficially signals to the user that interactive media player application 142 is listening for an input. In some embodiments, multiple different types of user inputs may trigger the same action, thereby giving a viewer multiple options for providing an input. For example, at a specified time point, the interactive media content may branch to a new video segment in response to either a selection of a graphic element or a voice input that links to the same video segment.

In an embodiment, the interactive media player application 142 may display a visual icon or output a predefined audio clip in response to successful recognition of speech in the captured audio input or successful matching to a predefined expected value. Alternatively, the interactive media player application 142 may remove a visual icon in response to the successful recognition. The client device 140 may correspondingly deactivate the microphone of the client device 140 and cease recording further audio input. Furthermore, the interactive media player application 142 may optionally cause the microphone to deactivate by default if a predefined time period passes without recognizing a response.

In an embodiment, the interactive media player application 142 detects a state of the client device 140 and determines the manner of prompting for an interaction and/or the manner of processing interactions based on the detected state. For example, the interactive media player application 142 may detect the type of client device 140 (e.g., mobile phone, desktop computer, laptop computer, home assistant device, tablet, television, etc.) the type of web browser, the type of operating system, whether microphone capabilities are active, and/or other aspects of the client device 140 or applications executing thereon. The interactive media player application 142 may then select from a set of predefined rules for issuing prompts and/or processing interactions depending on the detected state.

In an embodiment, the interactive media player application 142 comprises a web-based application that may be loaded in a web browser. Here, the interactive media player application 142 may be embedded in a web page via an embed code in the source file of the web page and configured to play an interactive media experience or a playlist of interactive media experiences upon loading the web page. The embed code may be shared (e.g., via a social network, ad network distribution using a VPAID protocol, etc.) to enable embedding of the interactive media player application 142 with the same interactivity, voice capabilities, and data tracking capabilities to be employed wherever the interactive media player application 142 and associated interactive media experience is shared. In an embodiment, the interactive media player application 142 may include a control element for sharing the interactive media player application 142 and an associated interactive media experience or playlist. For example, in response to receiving a selection of a share icon, receiving a voice input, detecting a predefined gesture, or other predefined input, the interactive media player application 142 may present the embed code to enable sharing.

In another embodiment, the interactive media player application 142 comprises an executable application executed by an operating system of the client device 140. In this case, the interactive media player application 142 may provide controls for accessing a sharable embed code for a web-based version of the interactive media application 142. Alternatively, or in addition, the interactive media player application 142 may include a control for accessing a downloadable package for installing the interactive media player application 142, which may be preloaded with a specific interactive media experience or playlist.

Additional features of the interactive media player 142 are described in further detail below with respect to FIG. 2.

The interactive media editor application 144 comprises a graphical user interface for creating or editing an interactive media experience that can be presented via an interactive media player application 142. For example, the interactive media editor application 144 enables a user to create and place objects (e.g., video segments, audio clips, images, etc.) on a timeline that controls timing of presentation of each object. Furthermore, the interactive media editor application 144 enables creation of associations between the objects that specifies a desired flow between presentation of the different objects (e.g., following presentation of a first video segment, play a second video segment). To enable interactive components, the interactive media editor application 144 enables creation of an interaction prompt and associated branches each corresponding to a different expected value of a user input received in response to the interaction prompt. Through the interactive media editor application 144, a user can perform actions such as defining a type of prompt, a visual or audio element associated with the prompt, a manner of receiving a user input, expected values in response to the prompt, and different actions (e.g., branches) to perform in response to the user input matching different expected values. After creating an interactive media experience using the graphical interface of the interactive media editor application 144, the interactive media editor application 144 may compile the interactive media experience into a metadata file that references the relevant objects, interactive elements, and general presentation structure to enable playing of the interactive media experience on an interactive media player application 142. Furthermore, the metadata file and media objects associated with the created interactive media experience may be stored in the metadata file database 134 and media database 132 respectively. The interactive media editor application 144 may later be used to retrieve and edit an interactive media player experience. Here, the interactive media editor application 144 may access a metadata file and regenerate the graphical user interface corresponding to the presentation structure to enable the user to edit the interactive media experience and recompile the metadata file.

The interactive media editor application 144 may be implemented as web-based editor accessible by a web browser or as an executable application executing on an operating system. A further example of a presentation structure that may be created using the interactive media editor application 144 is described in further detail below with respect to FIG. 3.

The audio interpretation server 150 comprises one or more computing devices or an application executing on one or more computing devices for facilitating speech-to-text conversion on the captured audio and returning an input string to the interactive media player application 142 corresponding to the audio. The input string may comprise one or more direct matching keywords that directly match speech detected in the captured audio. In an embodiment, the input string may additionally comprise one or more related keywords that do not necessarily directly match the speech but the audio interpretation server 150 determines are contextually related to the direct matching keywords. For example, the related keywords may include synonyms or other related terms that are predicted to relate to the intent of the user providing the audio input.

In an alternative embodiment, the captured audio may be processed locally on the device 140 using a local audio interpretation application that functions similarly to the audio interpretation server 150 described above.

The data server 160 may obtain captured voice inputs and/or the associated text strings from either the interactive media player application 142 or the audio interpretation server 150 and process the information to generate various analytics relating to the viewership. Here, the transmissions received by the data server 160 may also include relevant metadata such as time stamps, associated IP addresses, an identifier for the metadata file, objects included in the interactive media experience, or other related contextual information related to the audio. The data server 160 may process the audio and/or interpreted text strings in various ways to gain insight into the experience of a particular viewer or population of viewers viewing an interactive media experience. For example, the data server 160 may aggregate information about responses received for various input prompts of an interactive media experience in order to gain insight into how viewers are understanding the prompts and the preferences of a population of viewers. For example, if a videos segments prompts viewers for their favorite musician, the aggregated responses may be collected to gain insight about the most favorite musicians of the viewership. In another example, a sentiment analysis may be performed to predict a sentiment of viewers. In another example, the data server 160 may utilize the collected data to generate recommendations or targeted content likely to be of interest to a viewer or a population of viewers. In an embodiment, the raw audio, text string, and/or data feedback relating to aggregated user inputs, sentiment analysis, recommendations, or other information may be shared with a client device 140 associated with a creator of the interactive media experience to provide the creator with relevant feedback.

The media server 130 comprises one or more computing devices or an application executing on one or more computing devices accessible by one or more client devices 140 via the network 120. The media server 130 includes a media database 132 and a metadata file database 134. The media database 132 includes a plurality of objects such as video segments, images, audio clips, web links, text, or other objects that may be incorporated into an interactive media experience. Although FIG. 1 illustrates a media database 132 at a single media server 130, embodiments may include multiple distributed media databases 132 that store media objects at various distributed locations not necessarily under control of the media server 130. The metadata file database 134 stores metadata files that each control presentation of an interactive media experience. For example, a metadata file may specify specific objects from the media database 132 to present in accordance with a specified timing and manner of presentation. Furthermore, a metadata file may specify timing of one or more prompts for user inputs, and may specify one or more actions to be taken in response to different received user inputs to facilitate presentation of the interactive media experience as will be described in further detail below.

The network 120 may include any combination of local area and/or wide area networks, using both wired and/or wireless communication systems. In one embodiment, the network 120 uses standard communications technologies and/or protocols. In some embodiments, all or some of the communication links of the network 120 may be encrypted using any suitable technique.

Various components of the media system 100 of FIG. 1 such as the media server 130, the audio interpretation server 150, and the client devices 140 can each include one or more processors and a non-transitory computer-readable storage medium storing instructions therein that when executed cause the one or more processors to carry out the functions attributed to the respective components described herein.

Figure 2:
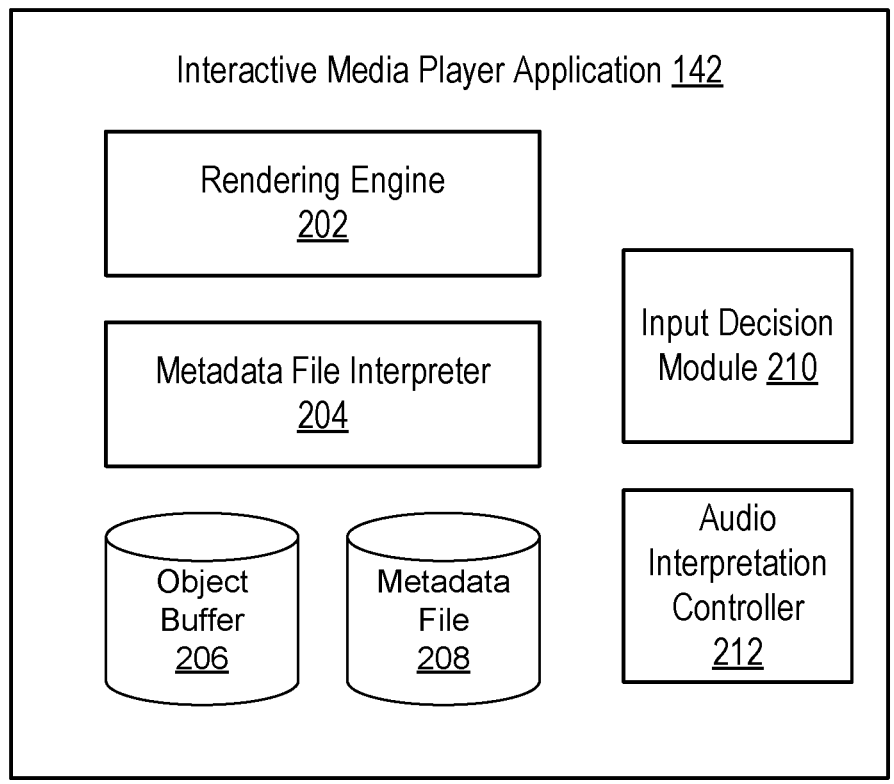
FIG. 2 is a block diagram illustrating an example embodiment of an interactive media player application.

FIG. 2 is a block diagram illustrating an example embodiment of an interactive media player application 142. The interactive media player application 142 comprises a rendering engine 202, a metadata file interpreter 204, an object buffer 206, a metadata file 208, an input decision module 210, and a audio interpretation controller 212. In alternative embodiments, the interactive media player application 142 may include different or additional modules.

As described above, the metadata file 208 comprises a set of instructions and references to media objects that define a presentation structure of the interactive media experience. The metadata file may be obtained from a metadata file database 134 on a media server 130 or may be obtained directly from another client device 140.

The metadata file interpreter 204 reads the metadata file 208 and executes the instructions to present the interactive media experience 142. When the metadata file interpreter 204 encounters an instruction to present a media object such as a video segment, image, or audio clip, the metadata file interpreter 204 causes the rendering engine 202 to obtain the media object and render it for presentation on an appropriate output device (e.g., a display and/or speakers). For example, the rendering engine 202 may perform decoding of the media object to transform the media object from a format that may be more suitable for storage or transmission to a format suitable for presentation on the client device 140. In an embodiment, the rendering engine 202 may receive a pointer to a network location where the object is stored (e.g., in a media database 132) and stream the media object to the client device 140. In other embodiments, the rendering engine 202 may obtain the media object from the object buffer 206 if the object has been previously stored locally. For example, in an embodiment, the metadata file interpreter 204 may cause the object buffer 206 to begin receiving and buffering the media object in advance of an expected playback time of the media object so that the media object is already at least partially stored locally upon the interactive media player application 142 reaching the intended playback time. In the case of a branch in the metadata file 208 where a user input may cause one of a plurality of different media objects to be presented depending on the user input, the metadata file interpreter 204 may cause the object buffer 206 to begin receiving and buffering each of the media objects corresponding to the different possible expected values in advance of receiving the user input so that the selected media object can begin playing immediately upon receiving the user input.

When the metadata file interpreter 204 encounters an instruction with a prompt for obtaining a user input as part of an interactive element in the interactive media experience, the input decision module 210 obtains the user input and make a decision regarding which, if any, of the expected values associated with the prompt match the user input. For example, in the case of a user input received via interaction with a visual element, the input decision module 210 may determine which visual element is selected. In the cause of a user input received via a voice input, the input decision module 210 may interface with the audio interpretation engine 150 to obtain a text string corresponding to the voice input (which may include direct matching keywords and related matching keywords) and make a determination as to which of the expected values, if any, matches the text string. In different embodiments, the input decision module 210 may employ natural language processing or various machine learning techniques to determine which expected value, if any, matches the text string with a sufficiently high (e.g., above a threshold) degree of certainty.

The audio interpretation controller 212 controls turning on and turning off of a microphone associated with the client device 140 based on commands from the metadata file interpreter 204 and controlling conversion of captured audio to text. For example, the audio interpretation controller 212 turns on the microphone in response to a command from the metadata file interpreter 204 generated based on an instruction in the metadata file 208 to obtain a voice input audio clip. The voice input audio clip may then be provided to the audio interpretation server 150 for speech-to-text conversion. The audio interpretation controller 212 may turn off the microphone in response to a subsequent command from the metadata file interpreter 204, after a predefined time period, or after the input decision module 210 successfully obtains a text string matching an excepted value. In an embodiment, the audio interpretation controller 212 may furthermore perform local compression of a captured audio signal before it is sent to the audio interpretation server 150.

In an embodiment in which the interactive media player application 142 is a web-based player loaded in a web browser application, the audio interpretation controller 212 may make a web browser application programming interface (API) call that causes the web browser to initiate a function on the client device 140 to turn on the microphone or turn off the microphone and send the captured audio to the interpretation server 150. In an alternative embodiment, the audio interpretation controller 212 may utilize a different speech to text API or decoder service that is different than the pre-assigned speech-to-text agent typically invoked through the web browser. In another embodiment, the audio interpretation may identify the web browser and determine whether to control the speech-to-text conversion through the web browser API or through an external mechanism depending on the type of web browser. In an embodiment in which the interactive media player application 142 is embodied as an executable application, the audio interpretation controller 212 may make an operating system call that causes the operating system of the client device 140 to initiate a function to turn on the microphone or turn off the microphone. The audio interpretation controller 212 may also cause the rendering engine 202 to present a visual or audio indicator when the microphone is turned on so that the viewer is informed that the microphone is listening, and remove the visual indicator (or present a new visual or audio indicator) to indicate when the microphone turns off.

Figure 3:
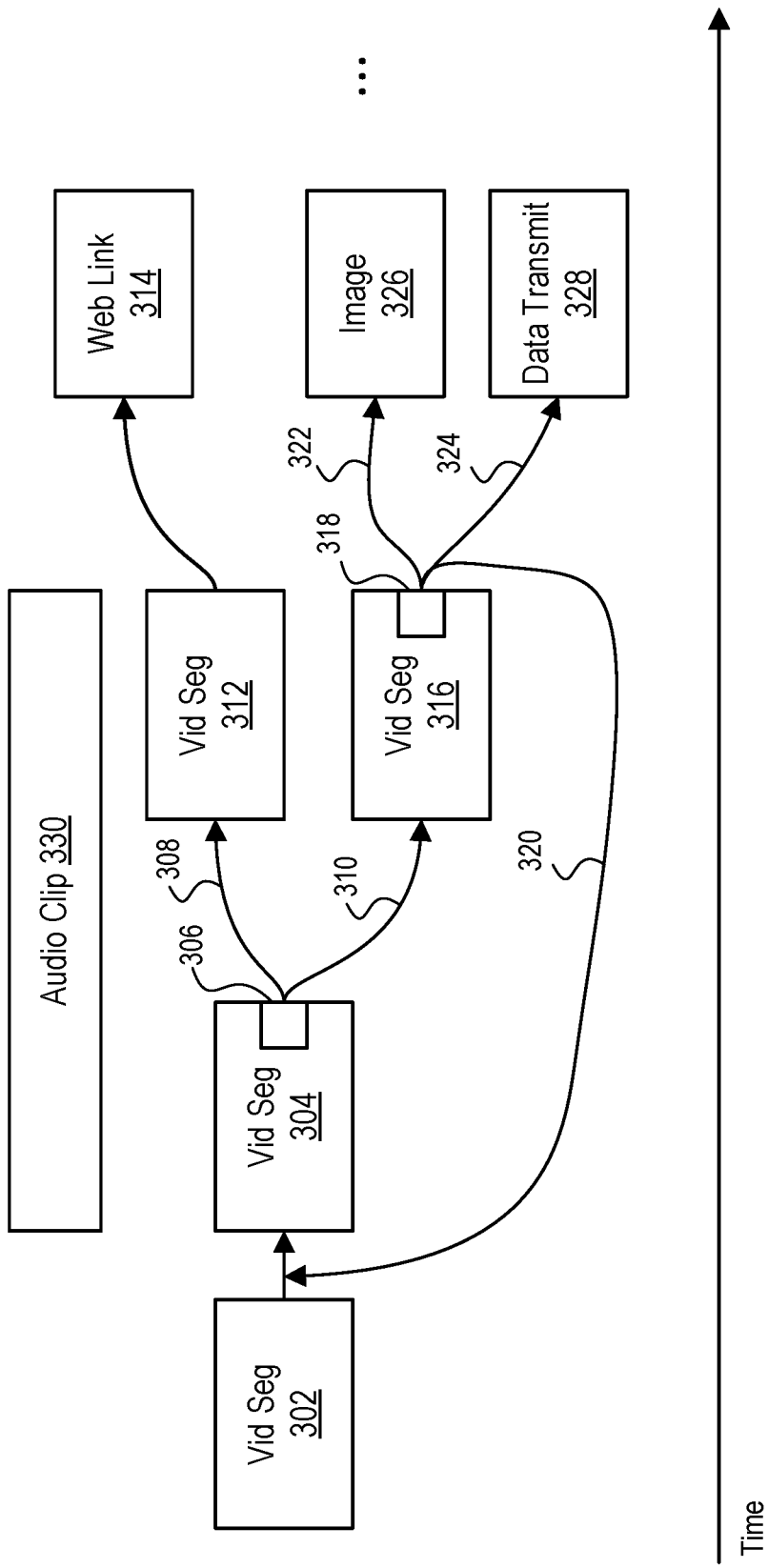
FIG. 3 is a diagram illustrating a presentation structure of an interactive media experience that can be generated by an interactive media editor application using a graphical user interface.

FIG. 3 illustrates an example of a graphical user interface representing a presentation structure for an interactive media experience that may be created using the interactive media editor application 144 and played using an interactive media player application 142 as described above. In the illustrated example, the interactive media editor application 144 first plays a first video segment 302 followed by a second video segment 304. Concurrently with the second video segment 304, an audio clip 330 begins playing. The second video segment 304 includes a prompt 306 for user input, which may be received, for example, via an interaction with a graphic element or via a voice input. The prompt 306 is associated with first expected value associated with a first branch 308 and a second expected value associated with a second branch 310. The prompts 306 may include, for example, selectable text or a graphic overlaid on video content corresponding to the different expected values and/or may include an audio prompt. In response to receiving a user input matching the first expected value (e.g., by receiving a selection of a graphic or text element associated with the first excepted value or providing an audio input matching the first expected value), the interactive media player application 142 follows the first branch 308 and plays third video segment 312 followed by an action to redirect the web browser to a web page 314 upon completion of the video segment 312. In response to receiving a user input matching the second expected value, the interactive media player application 142 follows the second branch 310 and plays a fourth video segment 316. The audio clip 330 continues to play during playback of the third or fourth video segment 312, 316. Thus, during this time period, some of the objects (video segments 312, 316) are selected dynamically based on user input, while another object (audio clip 330) is fixed. During the fourth video segment 316 a second prompt 318 is triggered for a user input that is associated with a third expected value associated with a third branch 320, a fourth expected value associated with a fourth branch 322, and a fifth expected value associated with a fifth branch 324. In response to receiving an input matching the third expected value, the interactive media player application 142 follows the third branch 320 to replay the second video segment 304. In response to receiving an input matching the fourth expected value, the interactive media player application 142 follows the fourth branch and displays an image 326. In response to receiving an input matching the fifth expected value, the interactive media player application 142 follows the fifth branch 324 and causes the client device 140 to execution and action 328 to transmit a data set to a pre-defined data server.

The interactive media editor application 144 beneficially enables creation of interactive media content such as the example in FIG. 3 using an intuitive graphical user interface. For example, the user interface may enable a user to create visual elements corresponding to objects 302, 304, 312, 314, 316, 326, 328, 330 and place them in desired locations within the graphical user interface corresponding to intended playback timing. Playback order can furthermore be controlled by creating links between objects (shown as arrows in FIG. 3) that indicate the desired flow from one object to another. Additionally, the graphical user interface may be used to insert visual elements corresponding to user input prompts 306, 318, associate different expected values with the prompts 306, 318, and associate branches 308, 310, 318, 322, 324 with each of the different expected values to control transitions in response to user inputs. Upon designing an interactive media experience with the interactive media editor application 144, a compiler may generate a metadata file that may be executed by an interactive media player application 142 to enable the interactive media experience, as described above.

Figure 4:
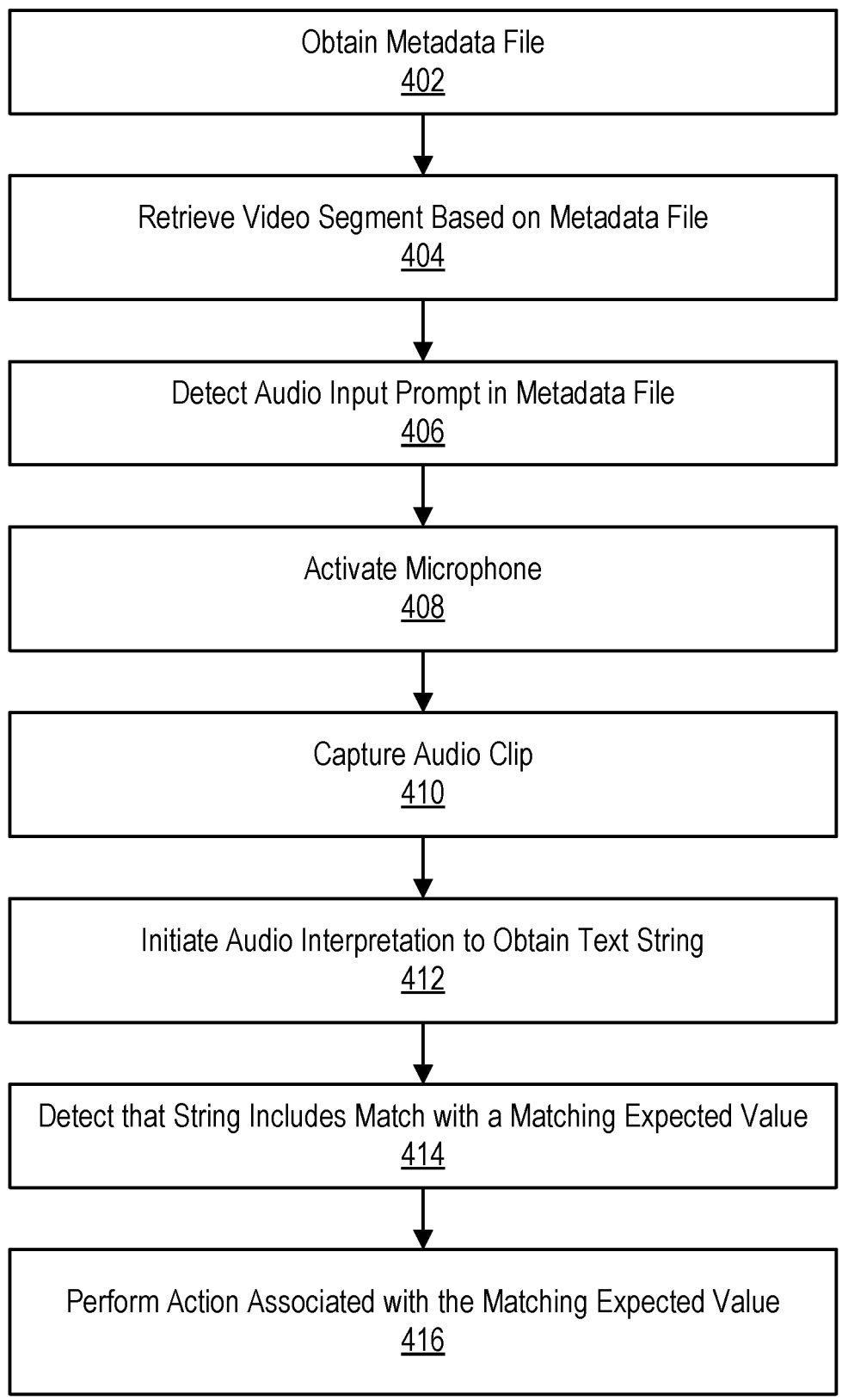
FIG. 4 is a flowchart illustrating an embodiment of a process for presenting an interactive media experience in an interactive media player application.

FIG. 4 illustrates an example embodiment of a process for operating an interactive media player application 142. The interactive media player application 142 obtains 402 a metadata file comprising a sequence of instructions for controlling presentation of interactive media content. The interactive media player application 142 executes an instruction of the metadata file to retrieve 404 a media segment specified by the metadata file. For example, the interactive media player application 142 may begin streaming the media segment from a network address specified by the metadata file. The interactive media player application 142 detects 406 an audio input prompt in the metadata file. Depending on the configuration of the metadata file, the audio input prompt may be configured to occur, for example, at an end of the playing video segment, at a particular time within the video segment, at a particular time point from a beginning of the interactive media session, in response to detecting a particular user input, or in response to some other event. In response to the audio input prompt, the interactive media player application 142 activates 408 a microphone of the client device 140. In an embodiment, a notification (e.g., a visual or audible notification) may be presented concurrently with activating the microphone to alert the viewer that the interactive media player application 142 is being put into a listening state. The interactive media player application 142 captures 410 an audio clip and initiates an audio interpretation of the captured audio clip to obtain a text string corresponding to speech in the captured audio. For example, as will be described in further detail below with respect to FIG. 5, the interactive media player application 142 may obtain one or more direct match keywords corresponding to phrases directly detected in speech of the captured audio clip. The interactive media player application 142 may furthermore obtain one or more related keywords that contextually relate to the one or more direct match keywords. The interactive media player application 142 detects 414 that the obtained text string has a match with a matching expected value from a set of predefined expected values defined in the metadata file. The interactive media player application 142 then performs 416 an action associated with the matching expected value in the metadata file. For example, the interactive media player application 142 may retrieve and play a specified media segment associated with the matching expected value.

Figure 5:
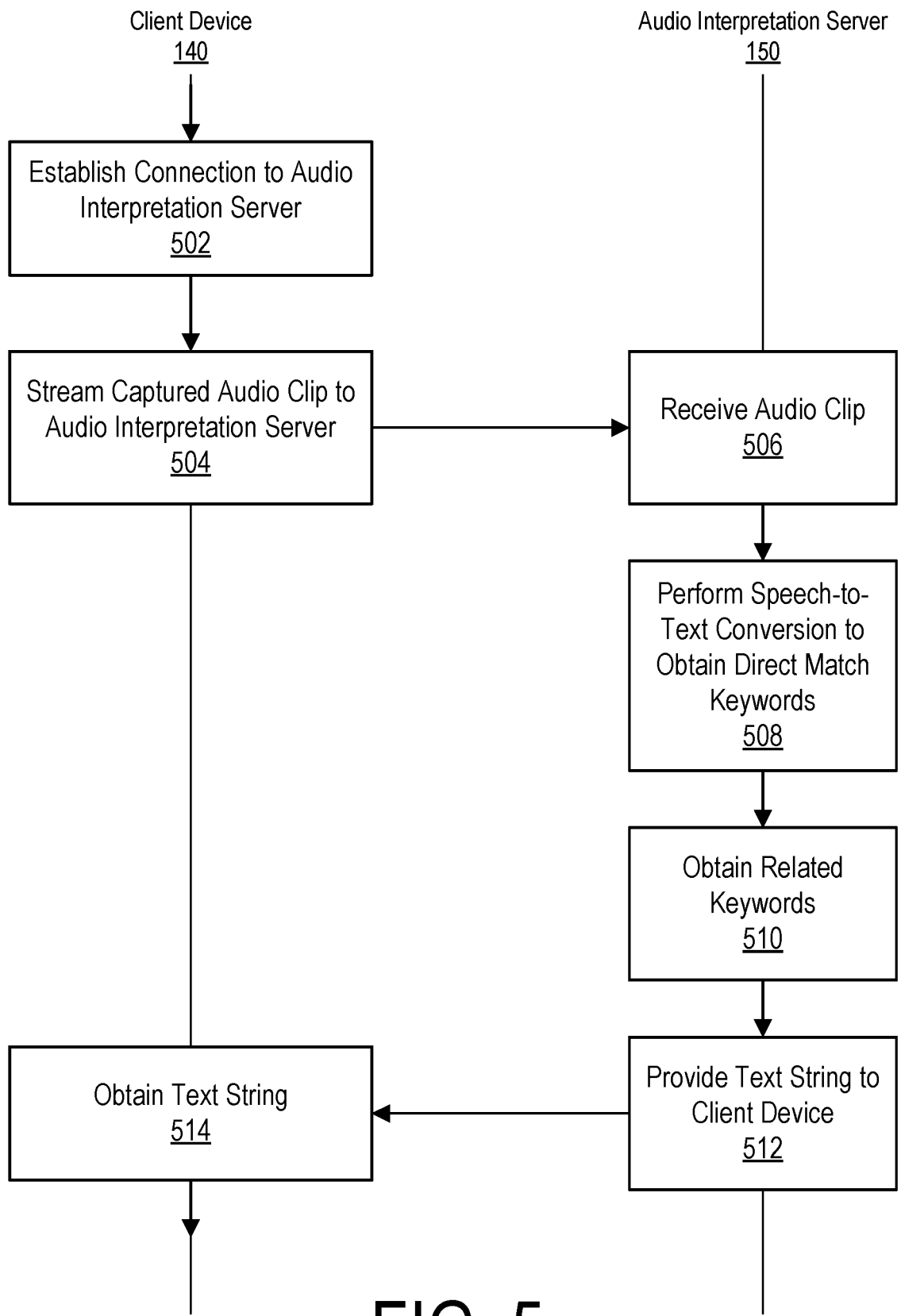
FIG. 5 is an interaction diagram illustrating an embodiment of a process for obtaining a text string associated with a voice input for controlling presentation of an interactive media experience.

FIG. 5 illustrates an example embodiment of a process for obtaining a text string associated with an audio clip obtained in response to a voice input prompt in interactive media content. The client device 140 establishes 502 a connection to the audio interpretation server 150. For example, in an embodiment, the client device 140 open a websocket connection to the audio interpretation server 150 that enables the interactive media player application 142 to stream 504 captured audio to the audio interpretation server 150 (e.g., in real-time or substantially real-time). The audio interpretation server 150 receives 506 the audio clip from the client device 140 and performs 508 a speech-to-text conversion to obtain one or more direct match keywords matching speech of the audio clip. In an embodiment, the speech-to-text conversion is performed by transmitting segments of the streamed audio from the audio interpretation server 150 to an external speech-to-text service (e.g., executing on an external server), and retrieving text strings corresponding to each segment in return via the websocket connection as the speech-to-text service completes conversion of each segment. Thus, the text strings are received at the interactive media player application 142 in substantially real-time as the audio is captured. Alternatively, the audio interpretation server 150 may locally perform the speech-to-text conversion. The audio interpretation server 150 processes 510 the direct match keywords to obtain related keywords. For example, in an embodiment, the audio interpretation server 150 performs a lookup of each of the direct match keywords in a related keywords database to obtain the related keywords. In another embodiment, a natural language processing engine may analyze the text string to extract contextual information and generate a set of related keywords that are predicted to be relevant to the text string. The audio interpretation server 150 provides 512 the text string to the client device 140, which may include one or more direct keywords and one or more related keywords. In an embodiment, the audio input server 150 streams the text string to the client device 140 via the websocket connection as the string is generated such that the client device 140 may obtain 512 the text string in substantially real-time with low latency. The client device 140 may further analyze the text string and control present of objects of the interactive media based on the analysis as described above with respect to FIG. 4.

Figure 6:
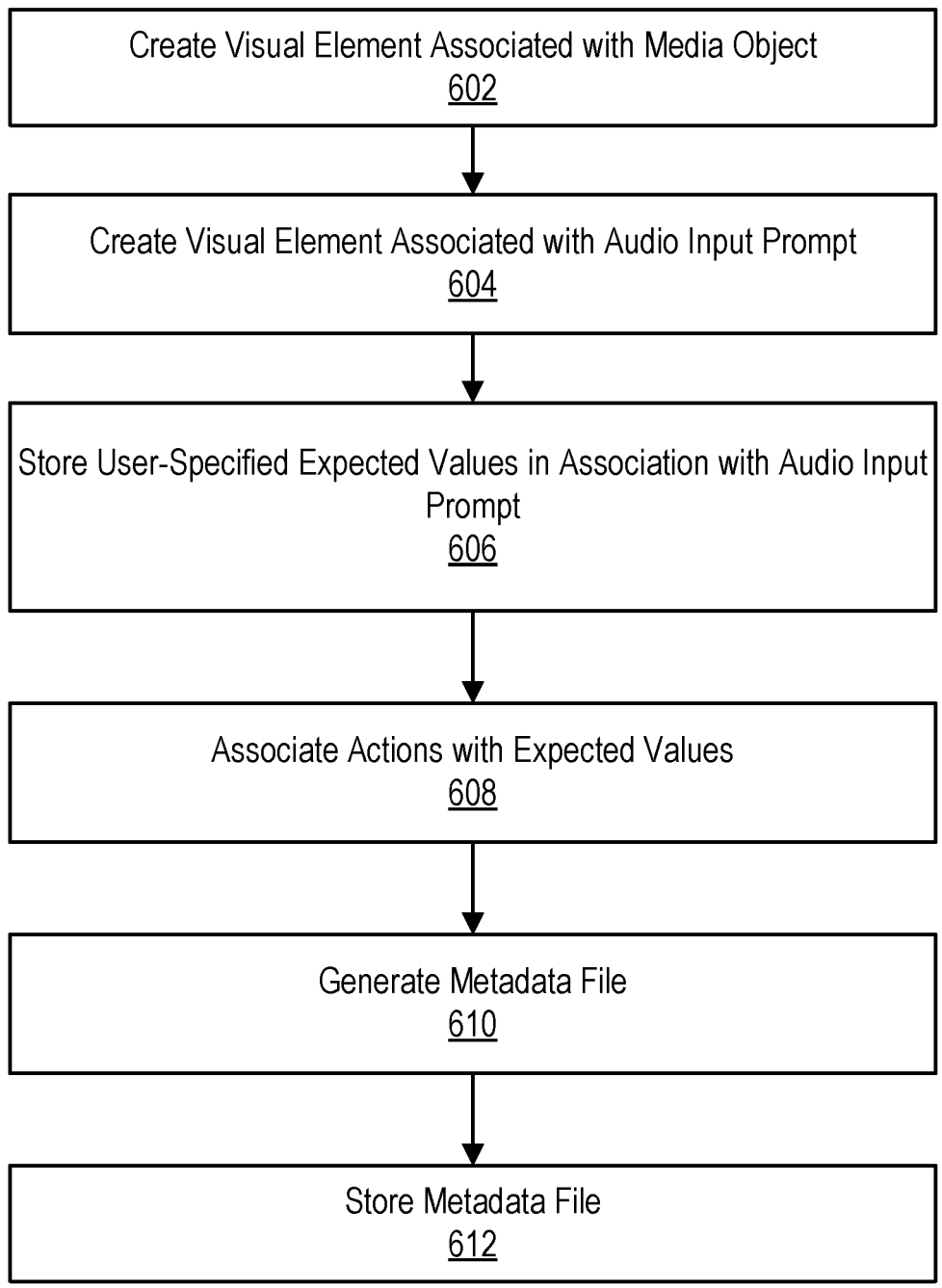
FIG. 6 is a flowchart illustrating an embodiment of a process for generating an example interactive media experience using an interactive media editor application.

FIG. 6 is a flowchart illustrating an example embodiment of a method for creating an interactive media experience in an interactive media editor application 144. The interactive media editor application 144 obtains via a graphical user interface, an input to create 602 a visual element corresponding to a media object (e.g., a video segment) associated with a first time period of the interactive media experience. The interactive media editor application 144 obtains another input to create 604 another visual element associated with an audio input prompt associated with a second time period, which may be after the first time period or during the first time period. Based on another input, the interactive media editor 144 obtains and stores 606 a user-specified set of expected values in association with the audio input prompt. The interactive media editor 144 may receive additional inputs to associate 608 different respective actions with each of the user-specified set of expected values. As the various inputs are received via the graphical user interface, the interactive media editor 144 updates the display to depict the various visual elements associated with the media segments, the prompts, the expected values, the various actions, and the associations between each of the elements. In response to an input to compile the interactive media experience, the interactive media editor 144 generates 610 a metadata file based the received inputs defining the presentation structure. The interactive media editor may store 612 the metadata file to a metadata file database 134 for subsequent retrieval and editing or for playback by an interactive media player application 142.

Throughout this specification, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Finally, as used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Upon reading this disclosure, those of skill in the art will appreciate still additional alternative structural and functional designs for the described embodiments as disclosed from the principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the embodiments disclosed herein without departing from the scope defined in the appended claims.

The invention claimed is:

1. A method for operating an interactive media player executing on a client device, the method comprising:
    obtaining a metadata file comprising a sequence of instructions for controlling playback of interactive media via the interactive media player;
    executing, by the interactive media player, a first instruction of the metadata file to retrieve a first media segment specified by the metadata file;
    playing the first media segment;
    executing, by the interactive media player, a second instruction of the metadata file to activate a microphone of the client device;
    capturing audio from the microphone of the client device;
    initiating, by the interactive media player, a text-to-speech conversion of the audio captured from the microphone to obtain one or more input keywords;
    comparing the one or more input keywords to a predefined set of expected values specified in the metadata file;
    detecting a matching response of the predefined set of expected values that corresponds to the one or more input keywords;
    executing by the interactive media player, a third instruction of the metadata file to perform a first action associated with the matching response in the metadata file.

2. The method of claim 1, wherein initiating, by the interactive media player, the text-to-speech conversion of the audio captured by the microphone comprises:
    streaming the audio to an audio interpretation server; and
    receiving from the audio interpretation server, the one or more input keywords corresponding to the audio.

3. The method of claim 1, further comprising:
    transmitting the captured audio or a text string representing the captured audio to a network address associated with the identifier of the metadata file.

4. The method of claim 1, wherein streaming the audio to the audio interpretation server further comprises:
    transmitting an identifier of the metadata file to the audio interpretation server to enable the audio interpretation server to send the captured audio or a text string representing the captured audio to a network address associated with the identifier of the metadata file.

5. The method of claim 1, wherein the one or more input keywords comprises a direct match keyword directly recognized in the audio and at least one related keyword having a stored association with the direct match keyword.

6. The method of claim 1, wherein executing the second instruction of the metadata file to activate the microphone of the client device comprises:
    executing an application programming interface (API) call of a web browser hosting the interactive media player to activate the microphone of the client device.

7. The method of claim 1, wherein executing the second instruction of the metadata file to activate the microphone comprises:
    overlaying a visual indicator on a viewing area of the interactive media player to indicate that the microphone is activated.

8. The method of claim 1, further comprising:
    de-activating the microphone responsive to at least one of: detecting the matching response, and a predefined time period expiring.

9. The method of claim 1, further comprising:
    prior to detecting the matching response, identifying a plurality of selectable video segments corresponding to different ones of the predefined set of expected values in the metadata file;
    locally buffering at least a portion of each of the plurality of selectable video segments to a local buffer of the client device; and
    wherein executing the third instruction of the metadata file to perform the action comprises loading from the local buffer, a selected one of the plurality of selectable media segments corresponding to the matching response.

10. The method of claim 1, further comprising:
    executing a fourth instructions of the metadata file to instantiate an interactive element in the interactive media player, the interactive element comprising at least one of:
    a visual asset displayed in the interactive media player;
    a web link displayed in the interactive media player; and
    an audio asset displayed in the interactive media player.

11. The method 10, further comprising:
    receiving a selection of the interactive element via an input device of the client device; and
    performing a second action associated with the selected interactive element specified by the metadata file.

12. The method of claim 1, wherein the first action comprises at least one of:
    playing a second media segment associated with the matching response in the metadata file;
    navigating, in a web browser, to a web page associated with the matching response in the metadata file;
    sending the one or more input keywords to a predefined network address associated with the matching response in the metadata file;
    accessing a hardware component of the client device associated with the matching response in the metadata file; and
    accessing a software component of the client device associated with the matching response in the metadata file.

13. The method of claim 1, further comprising:
    presenting an embed code to enable sharing of the interactive media player application and the interactive media, the embed code to cause the interactive media player application to be embedded in web page when the embed code is included in source code of the web page.

14. The method of claim 1, further comprising executing an interactive media editor application to generate the metadata file, wherein executing the interactive media editor application comprises:
obtaining, via a graphical user interface, a first input to associate a first visual element corresponding to a media segment stored at a first network address with a first time period of the interactive media;
obtaining, via the graphical user interface, a second input to associate a second visual element corresponding to an audio input prompt with a second time period of the interactive media;
obtaining, via the graphical user interface, a third input to define the predefined set of expected values and store the predefined set of responses in association with the second visual element;
obtaining, via the graphical user interface, a fourth input to associate a set of third visual elements with a third time period of the interactive media, the third visual elements corresponding to respective actions associated with each of the predefined set of responses; and
displaying, via the graphical interface, the first visual element, the second visual element, the set of third visual elements, and visual indications of associations between the first, second, and set of third visual elements and the first, second, and third time periods; and
generating the metadata file based on the first, second, third, and fourth inputs.

15. A non-transitory computer-readable storage medium storing instructions for operating an interactive media player on a client device, the instructions when executed by one or more processors causing the one or more processors to perform steps comprising:
obtaining a metadata file comprising a sequence of instructions for controlling playback of interactive media via the interactive media player;
executing, by the interactive media player, a first instruction of the metadata file to retrieve a first media segment specified by the metadata file;
playing the first media segment;
executing, by the interactive media player, a second instruction of the metadata file to activate a microphone of the client device;
capturing audio from the microphone of the client device;
initiating, by the interactive media player, a text-to-speech conversion of the audio captured from the microphone to obtain one or more input keywords;
comparing the one or more input keywords to a predefined set of expected values specified in the metadata file;
detecting a matching response of the predefined set of expected values that corresponds to the one or more input keywords;
executing by the interactive media player, a third instruction of the metadata file to perform a first action associated with the matching response in the metadata file.

16. The non-transitory computer-readable storage medium of claim 15, wherein initiating, by the interactive media player, the text-to-speech conversion of the audio captured by the microphone comprises:
streaming the audio to an audio interpretation server; and
receiving from the audio interpretation server, the one or more input keywords corresponding to the audio.

17. The non-transitory computer-readable storage medium of claim 15, the instructions when executed further causing the one or more processors to perform steps including:
transmitting the captured audio or a text string representing the captured audio to a network address associated with the identifier of the metadata file.

18. The non-transitory computer-readable storage medium of claim 15, wherein streaming the audio to the audio interpretation server further comprises:
transmitting an identifier of the metadata file to the audio interpretation server to enable the audio interpretation server to send the captured audio or a text string representing the captured audio to a network address associated with the identifier of the metadata file.

19. A method for creating an interactive media file in an interactive media editor, the method comprising:
obtaining, via a graphical user interface, a first input to associate a first visual element corresponding to a media segment stored at a first network address with a first time period of the interactive media;
obtaining, via the graphical user interface, a second input to associate a second visual element corresponding to an audio input prompt with a second time period of the interactive media;
obtaining, via the graphical user interface, a third input to define a predefined set of expected values and store the predefined set of expected values in association with the second visual element;
obtaining, via the graphical user interface, a fourth input to associate a set of third visual elements with a third time period of the interactive media, the third visual elements corresponding to respective actions associated with each of the predefined set of expected values;
displaying, via the graphical interface, the first visual element, the second visual element, the set of third visual elements, and visual indications of associations between the first, second, and set of third visual elements and the first, second, and third time periods;
generating the metadata file based on the first, second, third, and fourth inputs; and
storing the metadata file to a metadata file store.

20. The method of claim 19, further comprising:
loading the metadata file from the metadata file store; and
generating a representation of the graphical user interface including the first, second, and third visual elements based on the metadata file.

* * * * *